(12) United States Patent
Schmidt et al.

(10) Patent No.: US 10,844,887 B1
(45) Date of Patent: Nov. 24, 2020

(54) FLUID FLOW ENHANCING DEVICE AND CULVERT COMPRISING SAME

(71) Applicant: Vortex Pipe Systems LLC, Austin, TX (US)

(72) Inventors: Paul Wayne Schmidt, Carlton, OR (US); Avijit Ghosh, Austin, TX (US)

(73) Assignee: Vortex Pipe Systems LLC, Austin, TX (US)

( * ) Notice: Subject to any disclaimer, the term of this patent is extended or adjusted under 35 U.S.C. 154(b) by 0 days.

(21) Appl. No.: 16/878,252

(22) Filed: May 19, 2020

(51) Int. Cl.
   *F15D 1/00* (2006.01)
   *E02B 11/00* (2006.01)

(52) U.S. Cl.
   CPC .......... *F15D 1/0025* (2013.01); *E02B 11/005* (2013.01)

(58) Field of Classification Search
   CPC .............................. F15D 1/0025; E02B 11/005
   USPC ...................................... 138/39, 42
   See application file for complete search history.

(56) References Cited

U.S. PATENT DOCUMENTS

| | | | | |
|---|---|---|---|---|
| 3,820,570 | A * | 6/1974 | Holzhuter | F04D 29/406 138/39 |
| 4,790,355 | A * | 12/1988 | Kennedy | F16L 55/02 138/37 |
| 4,915,121 | A * | 4/1990 | Rains | F16L 7/00 137/15.04 |
| 5,632,962 | A * | 5/1997 | Baker | B01D 3/32 422/211 |
| 5,992,465 | A * | 11/1999 | Jansen | F16L 55/00 138/37 |
| 7,682,673 | B2 * | 3/2010 | Houston | A61F 2/90 428/35.8 |
| 8,246,343 | B2 * | 8/2012 | Ghani | F23L 7/007 431/9 |
| 9,228,542 | B2 * | 1/2016 | Anderson | F02M 35/10347 |
| 9,783,309 | B2 * | 10/2017 | Vue | B64D 13/08 |
| 10,302,104 | B2 * | 5/2019 | Schmidt | F16L 55/02772 |
| 2012/0222764 | A1 * | 9/2012 | Hermann | F02M 35/10019 137/808 |
| 2013/0061802 | A1 * | 3/2013 | Imano | B01D 47/025 118/324 |

(Continued)

*Primary Examiner* — Craig M Schneider
*Assistant Examiner* — David R Deal
(74) *Attorney, Agent, or Firm* — IVC Patent Agency; David O. Simmons

(57) ABSTRACT

Fluid flow enhancing devices disclosed herein are adapted to enhance flow of fluid through subsurface watershed conduits, for example, culverts, drainpipe and the like. Such fluid flow enhancing devices advantageously enhance watershed runoff functionality in subsurface watershed conduits by altering watershed flow from a parabolic flow pattern to a rotational flow pattern while still accommodating fish passage requirements. This change in flow pattern beneficially provides turbulence that disrupts and flushes debris out of the subsurface watershed conduits. This disruption and flushing establishes a passive cleaning functionality within the subsurface watershed conduits that serves to clean the subsurface watershed conduits after suitable upstream water delivery event (e.g., heavy rain, controlled water release, etc.). In doing so, these fluid flow enhancing devices overcome one or more shortcomings associated with subsurface watershed conduits in a manner that overcomes drawbacks associated with conventional design and in-use considerations for such subsurface watershed conduits.

22 Claims, 3 Drawing Sheets

(56) References Cited

U.S. PATENT DOCUMENTS

2016/0252113 A1\* 9/2016 Nord .................. F17D 1/16
                                                                               137/810

\* cited by examiner

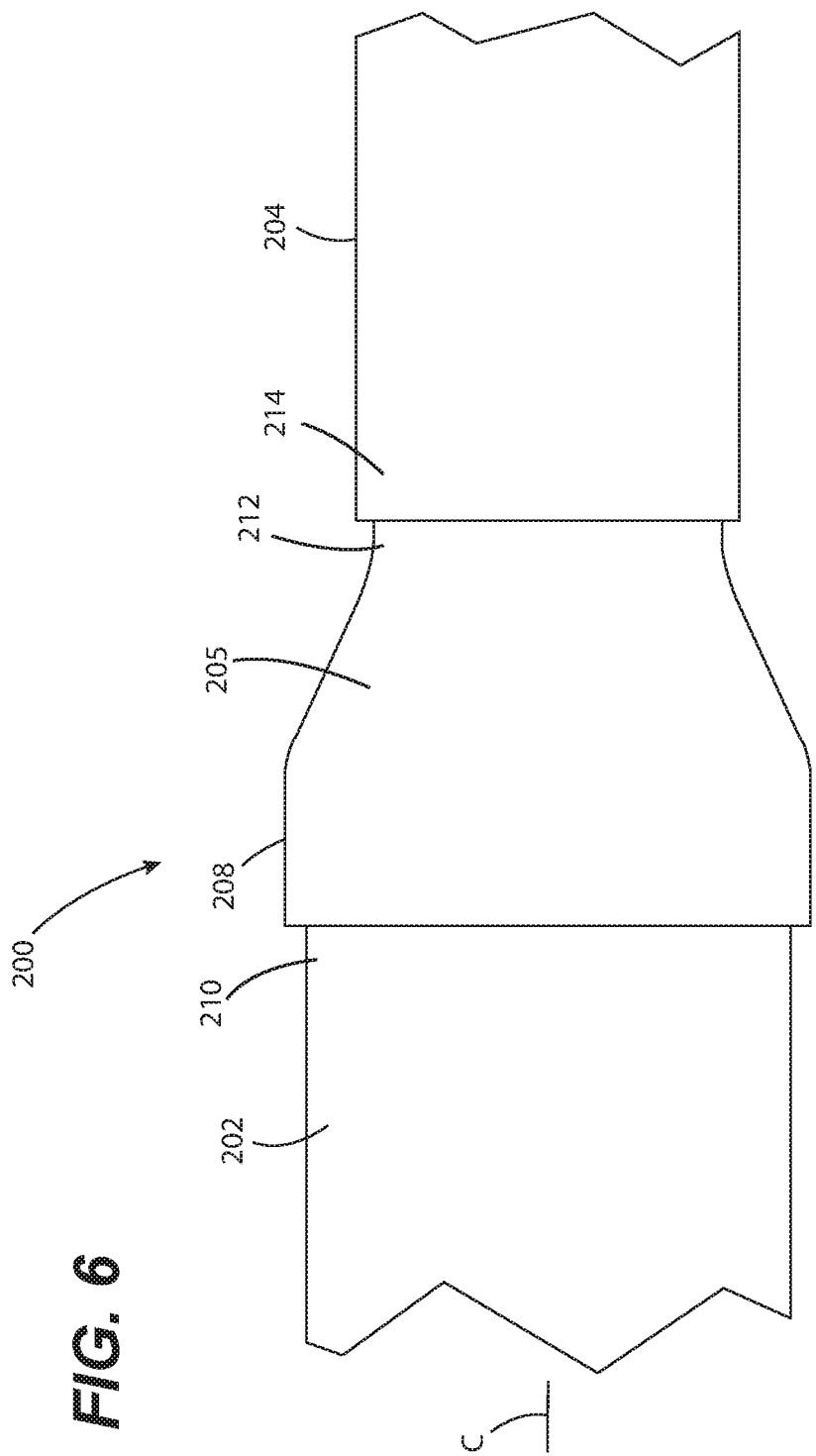

FLUID FLOW ENHANCING DEVICE AND CULVERT COMPRISING SAME

FIELD OF THE DISCLOSURE

The disclosures made herein relate generally to subsurface watershed conduits and, more particularly, to fluid flow enhancing devices adapted to enhance flow of fluid through subsurface watershed conduits and the like.

BACKGROUND

A culvert is well known to be a subsurface watershed conduit that allows water to flow under a road, railroad, trail or similar obstruction. Culverts and other types of subsurface conduit are known to be made in the form of, for example, corrugated steel pipe, concrete pipe, passage-defining concrete body and other materials. Typically, culverts in the form of pipe have their exterior surfaces(s) surrounded by soil, aggregate, concrete or a combination thereof. Culverts are also known to have a fluid flow passage that is circular, arched, elliptical of the like.

It is well known that culverts become a flow restriction in controlled flows when they reach approximately 98% of their flow capacity, as indicated by the Manning flow formula for gravity flow stream conditions. This flow formula is highly accurate for open culvert flow conditions— e.g., less than about 98% flow capacity with watershed water flowing as a stream through the culvert. However, once a culvert reaches 98% of its flow capacity, it is now considered an enclosed flow structure. As an enclosed flow structure, the culvert exhibits a "Parabolic" flow condition in which fluid flow is restricted and the culvert flow rate is at its maximum. When the upstream watershed flow rate is greater than the culvert's maximum flow rate, flooding occurs behind (i.e., upstream) and around the culvert. In cold weather environments, freezing conditions can cause further flow restrictions and flooding.

Additionally, as watershed runoff collects into a watershed collection structure such as a ditch, French drain, storm basin or the like, debris such as soil, sediment, leaves, branches, garbage, and other solids accumulates in the watershed collection structure. During a suitable watershed runoff event, debris picked up and carried by watershed runoff water in the watershed collection structure gains speed in the runoff water. This flow action often results in debris from the watershed collection structure becoming deposited into a downstream culvert or culverts. As this process is repeated continually during successive watershed runoff events, the deposition of debris in a culvert often causes flow within a culvert to become increasingly restricted. The restriction increases the likelihood of flooding by decreasing available flow capacity through the culvert and, thus, correspondingly decreases the degree of upstream drainage of watershed which often results in flooding.

To mitigate adverse impact on the environment, culverts are required by certain jurisdictions and authorities to meet various watershed runoff specifications and other design considerations. For example, various design criteria of culvert systems are outlined in Urban Drainage Design Manual, Hydraulic Engineering Circular No. 22 (HEC-22) issued by the U.S. Department of Transportation Federal Highway Administration (FHWA) as publication no. FHWA-NHI-10-009 in September of 2009 (updated in August of 2013). This design manual provides a comprehensive and practical guide for culverts and storm water systems which collect, convey and discharge storm water flowing along all highway rights-of-way. An example of an important design consideration in this design manual are the fish passage requirements, which dimensionally characterize an unrestricted flow area within the culvert for allowing efficient and safe passage of wildlife through the culvert such as to mitigate negative impact of stream function that adversely impacts fish spawning and rearing.

Therefore, fluid flow enhancing devices adapted to enhance flow of fluid through subsurface watershed conduits (e.g., culverts) in a manner that overcomes drawbacks associated with conventional design and in-use considerations for subsurface watershed conduits would be advantageous, desirable and useful.

SUMMARY OF THE DISCLOSURE

Embodiments of the disclosures made herein are directed to fluid flow enhancing devices adapted to enhance (e.g., amplify) flow of fluid through subsurface watershed conduits. More specifically, fluid flow enhancing devices in accordance with one or more embodiments of the disclosures made herein are adapted to enhance watershed runoff functionality in culverts. Such fluid flow enhancing devices provide enhance watershed runoff functionality in culverts while still accommodating fish passage requirements. In doing so, embodiments of the present invention advantageously overcome one or more shortcomings associated with culverts in a manner that overcomes drawbacks associated with conventional design and in-use considerations for culverts and other suitable types of subsurface watershed conduits.

Fluid flow enhancing devices in accordance with embodiments of the disclosures made herein are stationary apparatuses, which have no moving parts and which are typically installed upstream of a culvert and other suitable type of subsurface watershed conduit. These fluid flow enhancing devices modify the flow characteristics (e.g., current pattern) of the watershed runoff water (or other source of water— e.g., industrial water source) being directed into a culvert (or other similar types of subsurface watershed conduit), particularly when the flow reaches high flood levels. As watershed runoff water rises to these high flood levels, a fluid flow enhancing device in accordance with embodiments of the disclosures made herein causes the water's flow pattern to transform from a parabolic flow condition to a rotational flow condition that generally rotates about a centerline axis of the fluid flow apparatus or an axis extending parallel with the centerline axis of the fluid flow apparatus. Advantageously, this change in flow pattern amplifies that flow through the culvert and results in the culvert having a greater flow capacity. This greater flow capacity serves to eliminate back-pooling and flooding upstream of the fluid flow apparatus. Additionally, this change in flow pattern beneficially disrupts and flushes debris out of the culvert such as by creating turbulent fluid flow, off-axis fluid flow or a combination thereof. This disruption and flushing establishes a passive cleaning functionality within the culvert that serves to clean the culvert after suitable upstream water delivery event (e.g., heavy rain, controlled water release, etc.).

In one embodiment of the present invention, a fluid flow enhancing device comprises a fluid flow body and a plurality of semi-helical flow control bodies. The fluid flow body has a fluid flow inlet at a first end portion, a fluid flow outlet at a second end portion and a fluid flow passage extending between and in fluid communication with the fluid flow inlet and the fluid flow outlet. The plurality of semi-helical flow control bodies each have a helical length less than 360 degrees such that opposing end portions of each of the semi-helical flow control bodies are laterally and axially spaced apart from each other to define a perimeter opening therebetween. Each of the semi-helical flow control bodies are attached to an interior surface of the fluid flow body within the fluid flow passage thereof. The perimeter opening of each of the semi-helical flow control bodies is at least partially aligned with the perimeter opening of each adjacent one of the semi-helical flow control bodies such that the perimeter openings of the semi-helical flow control bodies jointly define a wildlife passage extending between the fluid flow inlet and fluid flow outlet of the fluid flow body along the interior surface of the fluid flow body.

In another embodiment of the present invention, a fluid flow enhancing device comprises a fluid flow body and a plurality of flow diverters. Embodiments of such flow diverters include semi-helical flow control bodies. The fluid flow body has a fluid flow inlet at a first end portion, a fluid flow outlet at a second end portion and a fluid flow passage extending between and in fluid communication with the fluid flow inlet and the fluid flow outlet. The fluid flow body is cylindrically-shaped. Opposing end portions of the cylindrically-shaped fluid flow body each define a respective one of the fluid flow inlet and the fluid flow outlet. The plurality of flow diverters are each attached to an interior surface of the fluid flow body within the fluid flow passage thereof. Each of the flow diverters extends partially around a centerline axis of the fluid flow passage in a helical manner such that opposing end portions of each of the flow diverters are laterally and axially spaced apart from each other to define a perimeter opening therebetween. The perimeter opening of each of the flow diverters is generally aligned with the perimeter opening of each adjacent one of the flow diverters such that the perimeter openings of the flow diverters jointly define a wildlife passage extending between the fluid flow inlet and fluid flow outlet of the fluid flow body along the interior surface of the fluid flow body, that provides for the legally required wildlife passage through an existing fluid flow conduit such as, for example, a culvert.

In another embodiment of the present invention, a method of making a fluid flow enhancing device comprises the steps of providing a fluid flow body, providing a plurality of semi-helical flow control bodies, and attaching each of the semi-helical flow control bodies to an interior surface of the fluid flow body within a fluid flow passage thereof. The fluid flow body has a fluid flow inlet at a first end portion and a fluid flow outlet at a second end portion. The fluid flow passage extends between and in fluid communication with the fluid flow inlet and the fluid flow outlet. The plurality of semi-helical flow control bodies each have a helical length less than 360 degrees such that opposing end portions of each of the semi-helical flow control bodies are laterally and axially spaced apart from each other to define a perimeter opening therebetween. Attaching each of the semi-helical flow control bodies to the interior surface of the fluid flow body includes rotationally orienting each of the semi-helical flow control bodies for causing the perimeter opening of each of the semi-helical flow control bodies to be at least partially aligned with the perimeter opening of each adjacent one of the semi-helical flow control bodies such that the perimeter openings of the semi-helical flow control bodies jointly define a wildlife passage extending between the fluid flow inlet and fluid flow outlet of the fluid flow body along the interior surface of the fluid flow body.

In one or more embodiments, each of the flow diverters has a central axis thereof extending generally colinear with a centerline axis of the fluid flow passage.

In one or more embodiments, a width of the perimeter opening of each of the flow diverters is generally the same.

In one or more embodiments, the perimeter opening of each of the flow diverters is generally aligned with the perimeter opening of each adjacent one of the flow diverters.

In one or more embodiments, the fluid flow passage extends generally straight between the fluid flow inlet and the fluid flow outlet.

In one or more embodiments, a lower edge portion of the opposing end portions of each of the flow diverters is located at a position below a transverse axis extending through a centerline axis of the fluid flow passage.

In one or more embodiments, the fluid flow body is cylindrically-shaped and opposing end portions of the cylindrically-shaped fluid flow body each define a respective one of the fluid flow inlet and the fluid flow outlet.

In one or more embodiments, the helical length of each of the flow diverters is not greater than about 200 degrees.

In one or more embodiments, each of the flow diverters is equally spaced from each adjacent one of the flow diverters and has a common pitch with respect to each of the other flow diverters.

In one or more embodiments, all of the flow diverters have the same dimensional specifications.

In one or more embodiments, each of the flow diverters has a fluid diverting surface that extends contiguously from a leading edge located a first distance from the fluid flow inlet to a trailing edge located a second distance from the fluid flow inlet, where the second distance is greater than the first distance.

In one or more embodiments, the leading edge of each of the flow diverters is truncated in a skewed manner such that an angle of the corner of the leading edge, which protrudes into the fluid flow is about 120 degrees or greater.

In one or more embodiments, attaching each of the flow diverters to the interior surface of the fluid flow body includes positioning each of the flow diverters such that a central axis thereof extends generally colinear with a centerline axis of the fluid flow passage.

In one or more embodiments, attaching each of the flow diverters to the interior surface of the fluid flow body includes rotationally orienting each of the flow diverters such that a lower edge portion of the opposing end portions of each of the flow diverters is located at a position below a transverse axis extending through a centerline axis of the fluid flow passage.

In one or more embodiments, attaching each of the flow diverters to the interior surface of the fluid flow body includes rotationally orienting each of the flow diverters such that a lower edge portion of the opposing end portions of each of the flow diverters is located at a position below a transverse axis extending through a centerline axis of the fluid flow passage.

These and other objects, embodiments, advantages and/or distinctions of the present invention will become readily apparent upon further review of the following specification, associated drawings and appended claims.

BRIEF DESCRIPTION OF THE DRAWINGS

FIG. 6 is an illustrative view showing a fluid flow apparatus in accordance with one or more embodiments of the disclosures made herein.

DETAILED DESCRIPTION

Fluid flow enhancing devices configured in accordance with one or more embodiments of the disclosures made herein is shown. These fluid flow enhancing devices are passive devices having no moving parts and can be installed immediately upstream of a subsurface culvert or other similar type of subsurface watershed conduit. As discussed below in greater detail, these fluid flow enhancing devices modify the flow characteristics (e.g., current pattern) of watershed runoff water or other source of water or fluid (e.g., industrial water source) being directed into a culvert or other similar type of subsurface watershed conduit, particularly when the flow is of a magnitude attributed to flood conditions.

In response to flow levels generally attributed to flood conditions, a fluid flow enhancing device in accordance with embodiments of the disclosures made herein causes the water's flow pattern to transform from a parabolic flow condition to a rotational flow condition. This change in flow pattern advantageously amplifies flow through the culvert and results in the culvert having a greater flow capacity thereby eliminating back pooling and flooding upstream of the fluid flow apparatuses. To this end, the change in flow pattern beneficially disrupts and flushes debris out of the culvert, thereby establishing a self-cleaning action within the culvert that serves to clean the culvert after suitable upstream water delivery event—e.g., heavy rain, controlled water release, etc.

Figure 1:
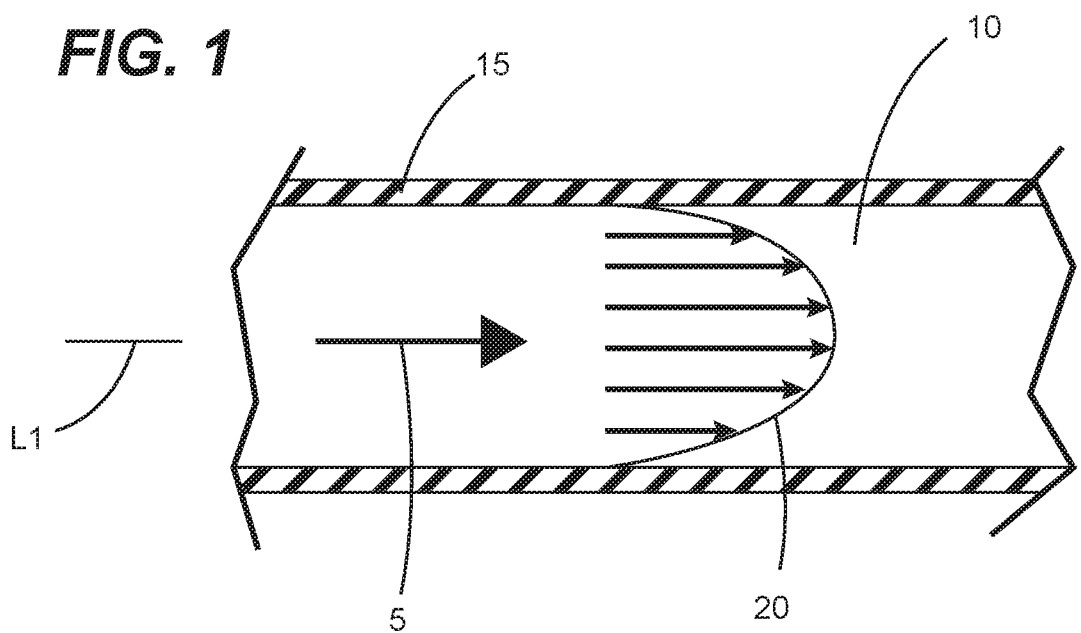
FIG. 1 is a diagrammatic view showing laminar flow effect within a fluid flow conduit.

As shown in FIG. 1, conventional flow of flowable material 5 within a flow passage 10 of a material flow conduit 15 has a parabolic flow profile characterized by laminar flow effect (i.e., laminar flow 20). The parabolic flow profile is a result of the laminar boundary layer along the surface of the material flow conduit 15 defining the flow passage 10. Flowable material (e.g., water) at the surface of the flow passage 10 exhibits considerable friction and zero flow velocity, thereby reducing velocity of the flowable material even at a considerable distance from the surface of the flow passage 10. In association with this reduced velocity, the laminar flow effect (e.g., friction at the surface of the material flow conduit) is known to increase head loss and heating of the flowable material.

Figure 2:
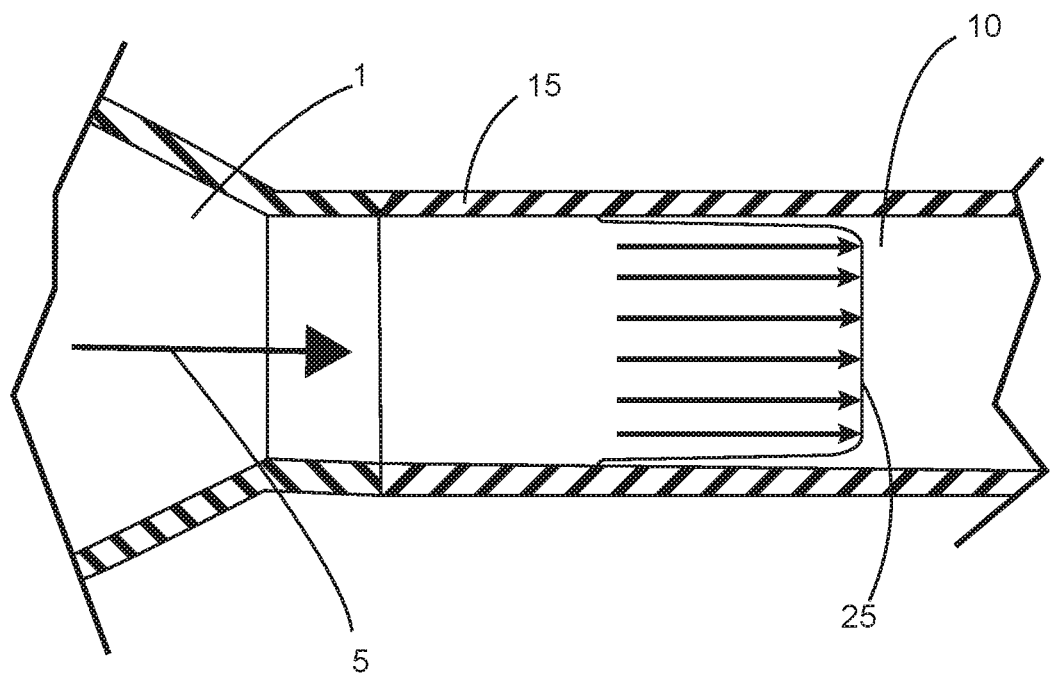
FIG. 2 is a diagrammatic view showing laminar flow effect within a fluid flow conduit generated by a fluid flow enhancing device configured in accordance with one or more embodiments of the disclosures made herein.

In contrast, a fluid flow enhancing assembly 1 configured in accordance with one or more embodiments of the disclosures made herein is configured in a manner that causes fluid flow to be transformed from a flow profile characterized by a parabolic flow condition to a flow profile being characterized by rotational flow condition (i.e., rotational flow profile 25). The rotational flow profile 25 is the result of rotational movement (also sometimes known as whirlpool, cyclonic or vortex flow) of the flowable material 5 about a longitudinal axis L1 of the material flow conduit 15 as generated by the fluid flow enhancing assembly 1. As a person or ordinary skill in the art will understand (e.g., as depicted in FIGS. 1 and 2), a rotational flow profile provides greater average flow velocity and volumetric flow than laminar flow for a given material flow conduit. Additionally, a rotational flow profile can mitigate adverse interaction between the surface of the material flow conduit and the flowable material. These advantageous aspects of the rotational flow profile arise from it accelerating and centralizing flow of the flowable material toward the central portion of the flow passage 10, thereby mitigating associated adverse flow conditions and amplifying flow magnitude.

Figure 3:
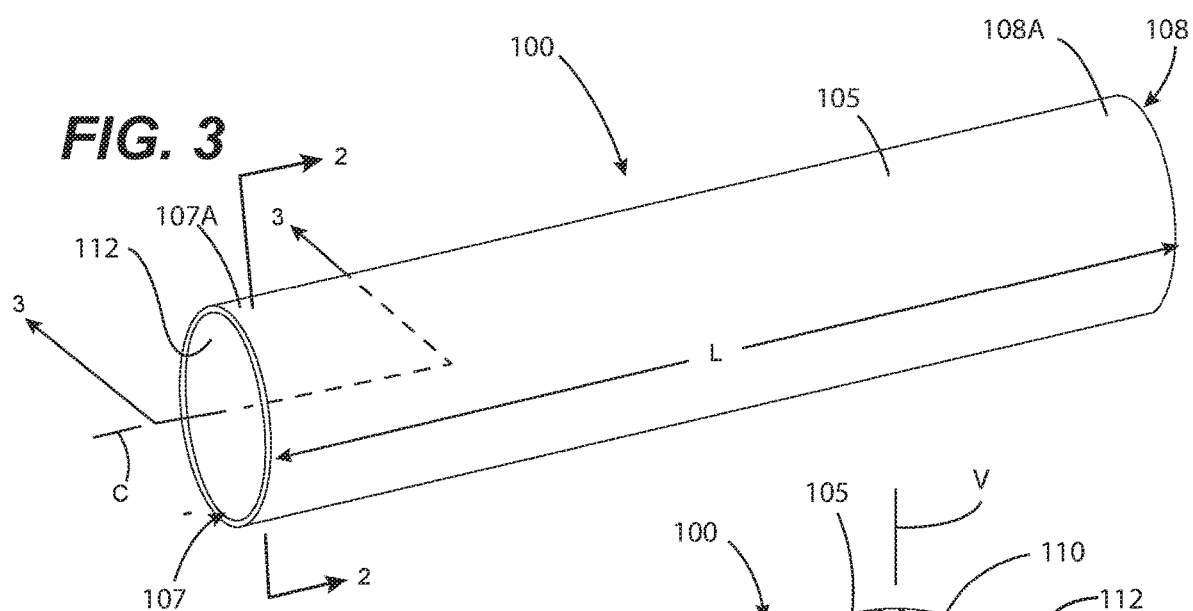
FIG. 3 is a perspective view showing a fluid flow enhancing device in accordance with one or more embodiment of the disclosures made herein.
Figure 4:
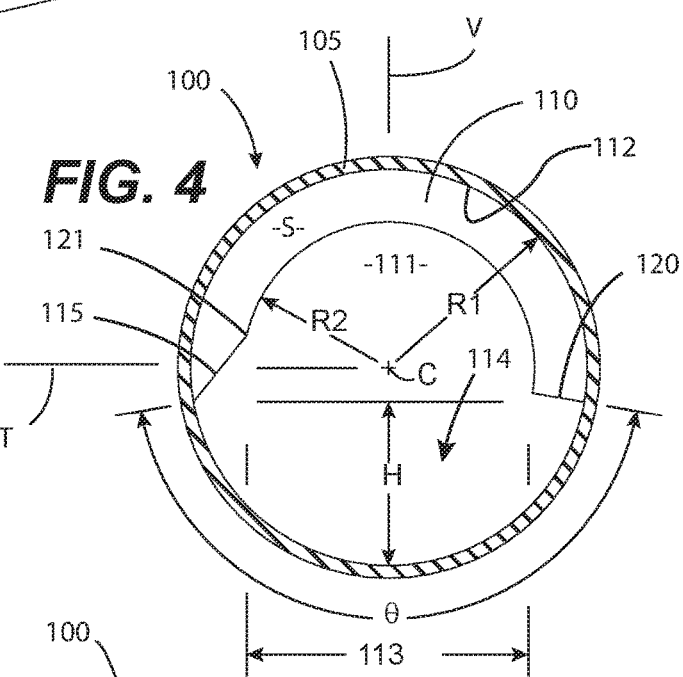
FIG. 4 is a cross-sectional view taken along the line 4-4 in FIG. 3.
Figure 5:
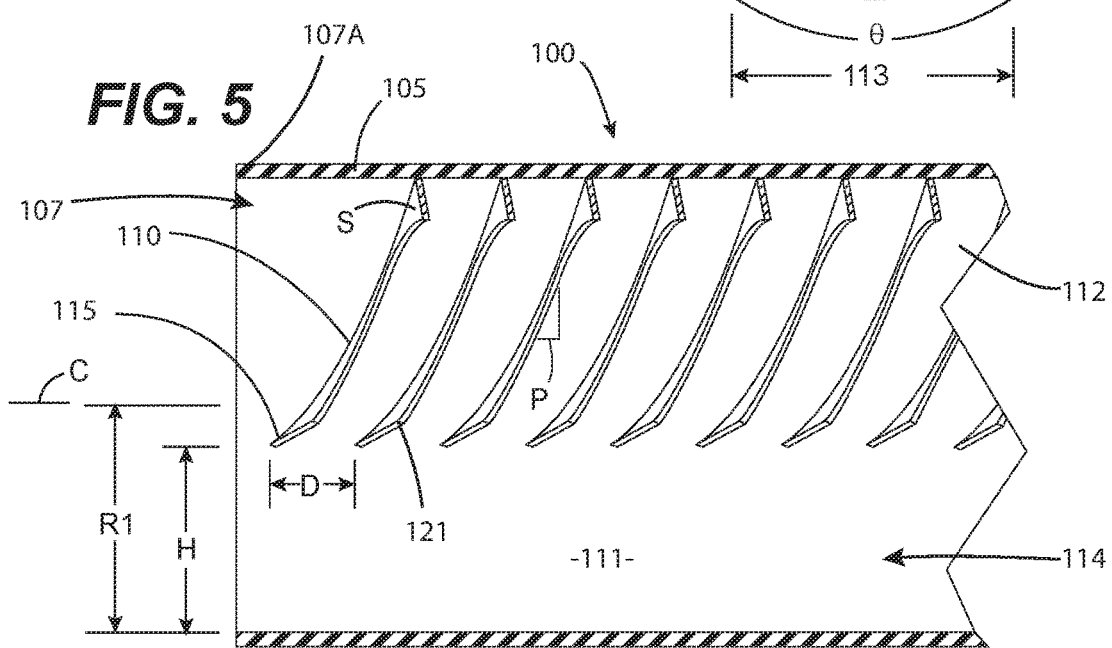
FIG. 5 is a cross-sectional view taken along the line 5-5 in FIG. 3.

Referring now to FIGS. 3-5, a fluid flow enhancing device 100 (i.e., a fluid flow enhancing device configured in accordance with one or more embodiments of the disclosures made herein) comprises a fluid flow body 105 and a plurality of semi-helical flow control bodies 110. The fluid flow body 105 has a fluid flow inlet 107 at a first end portion 107A, a fluid flow outlet 108 at a second end portion 108A and a fluid flow passage 111 extending between and in fluid communication with the fluid flow inlet 107 and the fluid flow outlet 108. As shown, the fluid flow body 105 is preferably cylindrically-shaped such that a centerline axis C of the fluid flow passage 111 is effectively straight. In one or more other embodiments, the fluid flow passage 111 can be non-cylindrical (e.g., a centerline axis C of the fluid flow passage 111 is curved as opposed to being effectively straight, the fluid flow body 105 can be conical shaped, etc.).

The plurality of semi-helical flow control bodies 110 are each attached to an interior surface 112 of the fluid flow body 105 within the fluid flow passage 111 thereof. The fluid flow body 105 is preferably made from a material such as steel, polymer, laminate, concrete or the like. The semi-helical flow control bodies 110 can each be made from a suitable metal such as steel or the like or a suitable polymeric material such as nylon, polyester, or the like. In preferred embodiments, the semi-helical flow control bodies 110 are each attached to the interior surface 112 of the fluid flow body 105 such that they are maintained in a stationary, fixed position and orientation during exertion of force from exposure to maximum loading from fluid (e.g., watershed water) flowing through the fluid flow passage 111. To this end, the semi-helical flow control bodies 110 can each be attached to the interior surface 112 of the fluid flow body 105 by a suitable means such as, for example, welding, threaded fasteners, rivets, adhesive bonding material, or a combination thereof. In one or more embodiments, as shown in FIG. 5, each of the semi-helical flow control bodies 110 is equally spaced from each adjacent one of the semi-helical flow control bodies 110 by a distance D and has a common pitch P with respect to each of the other semi-helical flow control bodies 110. It is contemplated herein that at least some of the semi-helical flow control bodies 110 is non-equally spaced from one or more adjacent ones of the semi-helical flow control bodies 110 and/or can have a pitch P that is different than one or more adjacent ones of the semi-helical flow control bodies 110.

As shown in FIG. 4, each of the semi-helical flow control bodies 110 has a helical length less than 360 degrees—i.e., helical length (angular distance)=360 degrees−Θ. In one or more preferred embodiments, the helical length is not greater than about 200 degrees. Preferably, each of the semi-helical flow control bodies 110 has a fluid diverting surface S that extends contiguously from a leading edge 115 located a first distance from the fluid flow inlet 107 to a trailing edge 120 located a second distance from the fluid flow inlet 107, where the second distance is greater than the first distance (i.e., in accordance with the pitch P of the semi-helical flow control bodies 110).

In one or more embodiments, as best shown in FIG. 4, the leading edge 115 of each of the semi-helical flow control bodies 110 is truncated in a skewed manner. Thus, an unsupported corner 121 of the leading edge 115 is defined by edges having an angle therebetween that is considerably greater than 90 degrees—e.g., about 120 degrees or greater. Truncation of the leading edge 115 is beneficial in view of the unsupported corner 121 being subject to high bending force resulting from the unsupported corner 121 protruding into the fluid flow within the fluid flow passage 111. By truncating the leading edge 115, material comprising and retaining the unsupported corner 121 is increased as compared to a corner that is defined by edges having an angle therebetween that is approximately 90 degrees. Additionally, the steep angle of the unsupported corner 121 when the leading edge 115 is truncated also serves to efficiently and effectively deflect debris toward a central portion of the fluid flow.

In view of the semi-helical flow control bodies 110 having a helical length less than 360 degrees, a leading edge portion 115 and a trailing edge portion 120 of each of the semi-helical flow control bodies 110 (i.e., opposing end portions 115, 120) are laterally and axially spaced apart from each other. These spaced-apart opposing end portions 115, 120 jointly define a perimeter opening 113 of a respective one of the semi-helical flow control bodies 110. In preferred embodiments, a width of the perimeter opening 113 of each of the semi-helical flow control bodies 110 is generally the same—i.e., all of the semi-helical flow control bodies 110 having identically or effectively the same dimensional specifications (e.g., fluid diverting surface width, fluid diverting surface axial angle, body pitch, helical length, material thickness, and the like). In one or more embodiments, as shown in FIGS. 4 and 5, a lower edge portion of the opposing end portions 115, 120 of each of the semi-helical flow control bodies 110 is located at a position below a transverse axis T extending through the centerline axis C of the fluid flow passage 111.

As shown in FIGS. 4 and 5, the perimeter opening 113 of each of the semi-helical flow control bodies 110 is at least partially aligned with the perimeter opening 113 of each adjacent one of the semi-helical flow control bodies 110. In preferred embodiments, the perimeter opening 113 of each of the semi-helical flow control bodies 110 is generally aligned with the perimeter opening 113 of each adjacent one of the semi-helical flow control bodies 110—e.g., closely aligned as permitted by reasonable placement and attachment approaches. Such alignment can also include each of the semi-helical flow control bodies 110 having a central axis thereof that extends generally colinear with the centerline axis C of the fluid flow passage 111.

In operation, the fluid flow enhancing device 100 advantageously causes fluid flow (e.g., watershed water) through the fluid flow passage 111 to transition from parabolic flow condition to a rotational flow condition when a fluid level is sufficiently high so as to engage the semi-helical flow control bodies 110. The parabolic flow condition can be characterized by low fluid flow velocity (e.g., at or approaching 0 ft/sec) at the interior surface 112 of the fluid flow body 105 and maximum fluid flow velocity at a maximum distance from the interior surface 112 of the fluid flow body 105. In contrast, flow considerations such as turbulence, non-linear flow direction and other laminar flow limiting considerations cause the rotational flow condition to induce greater flow velocities adjacent to the interior surface 112 of the fluid flow body 105. In doing so, fluid flow under the rotational flow condition exhibits markedly greater flow velocity over a larger flow area of the fluid flow body 105. This beneficial velocity of rotational flow (e.g., vortex and tornadic flow) as compared to parabolic flow (e.g., laminar flow) are well known in the art.

Fluid flow transition to the rotation flow condition is at least partially a function of a depth of fluid flow within the fluid flow passage 111 relative to a perimeter opening height H (shown in FIGS. 4 and 5) defined by a lowermost portion of the opposing end portions 115, 120 of the semi-helical flow control bodies 110. To this end, as installed, the fluid flow enhancing device 100 is oriented such that a vertical axis V generally bisects the semi-helical flow control bodies 110. When the depth of the fluid flow through the fluid flow enhancing device 100 is less than the perimeter opening height H, fluid flows undisturbed by the semi-helical flow control bodies 110. Such undisturbed flow is parabolic flow characterized by the well-known Manning equation. It is known to a person of ordinary skill in the art of fluid flow that 1.) the Manning equation is a commonly used equation to analyze open channel flows, 2.) it is a semi-empirical equation for simulating water flows in channels and culverts where the water is open to the atmosphere—i.e., not flowing under pressure, 3.) can be any shape—e.g., circular, rectangular, triangular, etc., and 4.) is purported to have been first presented in 1889 by Robert Manning. As disclosed in U.S. Pat. No. 6,692,189, which is incorporated herein in its entirety by reference, the Manning equation is:

$$V=(1/n)*k*R^{2/3}*S^{1/2}$$

where:
V=Mean velocity (m/s, ft/s);
k=1.49 for English units, or 1.00 for SI units;
n=Manning's roughness (unitless);
R=Hydraulic radius (m, ft); and
S=Friction slope (m/m, ft/ft).

As the fluid flow level in the fluid flow enhancing device 100 increased to a level above the perimeter opening height H, the fluid of the fluid flow impinges the semi-helical flow control bodies 110. Sufficient impingement results in the fluid flow transitioning from the parabolic flow condition to the rotational flow condition. This interaction between the fluid flow and the semi-helical flow control bodies 110 becomes more pronounced the farther the fluid flow level rises above the perimeter opening height H, up to the level where the entire fluid flow passage 111 is full of fluid flow. To this end, at the leading edge 115 of the semi-helical flow control bodies 110, momentum of the fluid and the helical profile of the semi-helical flow control bodies 110 causes the fluid flow to begin to be lifted onto the fluid diverting surface S of the semi-helical flow control bodies 110. Correspondingly, at the trailing edge 120 of the semi-helical flow control bodies 110, momentum of the fluid and the helical profile of the semi-helical flow control bodies 110 causes the fluid flow to begin to be pushed down onto the interior surface 112 of the fluid flow body 105. Additionally, axial fluid flow through the fluid flow passage 111 created a pressure differential at the rear surface of the semi-helical flow control bodies 110 causing fluid to be pull along the rear surface of the semi-helical flow control bodies 110. These lifting, pushing and pulling actions on the fluid flow caused by the semi-helical shape of the flow control bodies 110 results in a transition of the fluid flow from the parabolic flow condition to the rotational flow condition and associated enhancement of fluid flow rate.

Alignment of the perimeter opening 113 of the semi-helical flow control bodies 110, as discussed above, results in formation of a wildlife passage 114 that extends between the fluid flow inlet 107, the fluid flow outlet 108. The wildlife passage 114 is characterized by a space between the opposing end portions 115, 120 of the semi-helical flow control bodies 110 and the portion of the interior surface 112 of the fluid flow body 105 extending between such opposing end portions 115, 120 of each of the semi-helical flow control bodies 110. Advantageously, the wildlife passage 114 permits free passage of wildlife through the fluid flow passage 111 of the fluid flow body 105. Examples of such wildlife include, but are not limited to, aquatic wildlife (e.g., fish, turtles, etc.), legged wildlife (e.g., rabbits, squirrels, raccoons, etc.) and the like. The wildlife passage 114 allows wildlife to readily swim and/or walk through the fluid flow enhancing device 100 without having to traverse over or otherwise be impeded by one or more of the semi-helical flow control bodies 110.

In preferred embodiments, fluid flow enhancing device configured in accordance with one or more embodiments of the disclosures made herein (e.g., the fluid flow enhancing device 100) meet governmental fish passage requirements. For example, the wildlife passage 114 of the fluid flow enhancing device 100 can be configured to specifically meet fish passage requirements set forth in Urban Drainage Design Manual, Hydraulic Engineering Circular No. 22 (HEC-22) issued by the U.S. Department of Transportation Federal Highway Administration (FHWA) as publication no. FHWA-NHI-10-009 in September of 2009 (updated in August of 2013). Such fish passage requirements of HEC-22 are characterized as an unrestricted area of a culvert of not less than 20% of the culvert height (i.e., the minimum wildlife passage height). Thus, in the case where the fluid flow enhancing device 100 is placed upstream of a culvert (i.e., as opposed to a contemplated implementation where the fluid flow enhancing device 100 is used as the culvert), the minimum height of the unrestricted wildlife passage 114 of the fluid flow enhancing device 100 corresponds to 20% of the height of the associated downstream culvert. In addition to the governmental fish passage requirements, fluid flow enhancing device configured in accordance with one or more embodiments of the disclosures made herein can be configured to meet other government-designated design requirements of such Referring now to FIG. 6, a fluid flow apparatus 200 in accordance with one or more embodiments of the disclosures made herein is shown. The fluid flow apparatus 200 includes a fluid flow enhancing device 202, a culvert 204, and a coupler 206 engaged between the fluid flow enhancing device 202 and the culvert 204. The fluid flow enhancing device 202 is a fluid flow enhancing device configured in accordance with one or more embodiments of the disclosures made herein (e.g., the fluid flow enhancing device 100 discussed above in reference to FIGS. 3-5). An inlet portion 208 of the coupler 206 is engaged with an outlet portion 210 of the fluid flow enhancing device 202 and an outlet portion 212 of the coupler 206 is engaged with an inlet portion 214 of the fluid flow enhancing device 202. Such engagement of the fluid flow enhancing device 202, the culvert 204 and the coupler 206 provides for fluid communication therebetween, thus enabling for fluid flow through the fluid flow apparatus 200. In one or more embodiments, the coupler 206 can be integral with the fluid flow enhancing device 202, thereby forming a fluid flow enhancing assembly.

Beneficially, in preferred embodiments, fluid flow enhancing devices configured in accordance with one or more embodiments of the disclosures made herein are each capable of use with a variety of culvert sizes (i.e., semi-universal fluid flow apparatuses). Examples of such semi-universal fluid flow enhancing devices include, but are not limited to: 1.) a semi-universal fluid flow enhancing device having about a 42-inch ID (e.g., inside diameter) that is about 108" long can be configured for being utilized with culverts from about 21-inch ID to about 36-inch ID, 2.) a semi-universal fluid flow enhancing device having about a 72-inch ID (e.g., inside diameter) that is about 108" long can be configured for being utilized with culverts from about 36-inch ID to about 64-inch ID, and 3.) a semi-universal fluid flow enhancing device having about a 128-inch ID (e.g., inside diameter) that is about 320" long can be configured for being utilized with culverts from about 64-inch ID to about 109-inch ID. To this end, a fluid flow system configured in accordance with one or more embodiments of the disclosures made herein can comprise a set of tapered body couplers (e.g., having tapered conical section with a taper ratio of about 3.5 inches to about 4.0 inches per foot) that enable a plurality of different size culverts to be engaged with a single fluid flow enhancing device configured in accordance with one or more embodiments of the disclosures made herein.

In addition to the enhanced fluid flow rates resulting from the transition from parabolic flow conditions to rotational flow conditions, the rotational flow conditions provided by a fluid flow enhancing device configured in accordance with one or more embodiments of the disclosures made herein also beneficially disrupts and dislodges debris within a downstream subsurface watershed conduit such as a culvert (and at least a downstream portion of the fluid flow enhancing device). This disruption and dislodging of the debris serves to remove such debris that has gathered within the downstream subsurface watershed conduit (and at least a downstream portion of the fluid flow enhancing device), thereby providing a passive cleaning functionality that results in response to fluid flow through the fluid flow enhancing device exhibiting rotational flow conditions.

It is disclosed herein that a fluid flow enhancing device configured in accordance with one or more embodiments of the disclosures made herein can be used as a portion of a culvert itself. For example, in such an implementation, the fluid flow enhancing device can be entirely or partially part of a subsurface watershed conduit (e.g., extending partially or entirely under a roadway). To this end, a fluid flow conduit (e.g., conventional section of culvert tubing) can be engaged with an inlet of the fluid flow enhancing device, an outlet of the fluid flow enhancing device, or both.

In one or more other embodiments of the disclosures made herein, a method of making a fluid flow enhancing device is provided. The method can comprise the steps of providing a fluid flow body, providing a plurality of semi-helical flow control bodies and attaching each of the semi-helical flow control bodies to an interior surface of the fluid flow body within a fluid flow passage thereof to form a fluid flow enhancing device such as, for example, the fluid flow enhancing device 100 discussed above in reference to FIGS. 3-5. The fluid flow body has a fluid flow inlet at a first end portion and a fluid flow outlet at a second end portion. The fluid flow passage extends between and in fluid communication with the fluid flow inlet and the fluid flow outlet. The plurality of semi-helical flow control bodies each have a helical length less than 360 degrees such that opposing end portions of each of the semi-helical flow control bodies are laterally and axially spaced apart from each other to define a perimeter opening therebetween.

In one or more embodiment of the method of making a fluid flow enhancing device, attaching each of the semi-helical flow control bodies to the interior surface of the fluid flow body includes rotationally orienting each of the semi-helical flow control bodies for causing the perimeter opening of each of the semi-helical flow control bodies to be at least partially aligned with the perimeter opening of each adjacent one of the semi-helical flow control bodies such that the perimeter openings of the semi-helical flow control bodies jointly define a wildlife passage extending between the fluid flow inlet and fluid flow outlet of the fluid flow body along the interior surface of the fluid flow body. In one or more embodiment of the method of making a fluid flow enhancing device, attaching each of the flow diverters to the interior surface of the fluid flow body includes rotationally orienting each of the flow diverters such that a lower edge portion of the opposing end portions of each of the flow diverters is located at a position below a transverse axis extending through a centerline axis of the fluid flow passage. In one or more embodiment of the method of making a fluid flow enhancing device, attaching each of the flow diverters to the interior surface of the fluid flow body includes rotationally orienting each of the flow diverters such that a lower edge portion of the opposing end portions of each of the flow diverters is located at a position below a transverse axis extending through a centerline axis of the fluid flow passage.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in all its aspects. Although the invention has been described with reference to particular means, materials and embodiments, the invention is not intended to be limited to the particulars disclosed; rather, the invention extends to all functionally equivalent technologies, structures, methods and uses such as are within the scope of the appended claims.

What is claimed is:

1. A fluid flow enhancing device, comprising:
    a fluid flow body having a fluid flow inlet at a first end portion, a fluid flow outlet at a second end portion and a fluid flow passage extending between and in fluid communication with the fluid flow inlet and the fluid flow outlet; and
    a plurality of semi-helical flow control bodies each having a helical length greater than 180 degrees and less than 360 degrees such that opposing end portions of each of the semi-helical flow control bodies are laterally and axially spaced apart relative to a centerline axis of the fluid flow body to define a perimeter opening therebetween, wherein each of the semi-helical flow control bodies is axially spaced apart along the centerline axis of the fluid flow body from each adjacent one of the semi-helical flow control bodies, wherein at least a lower edge portion of each of said opposing end portions is located at a position below a reference axis extending transversely through the centerline axis of the fluid flow body, wherein each of the semi-helical flow control bodies is attached to an interior surface of the fluid flow body within the fluid flow passage thereof, and wherein the perimeter opening of each of the semi-helical flow control bodies is at least partially aligned with the perimeter opening of each adjacent one of the semi-helical flow control bodies.

2. The fluid flow enhancing device of claim 1 wherein each of the semi-helical flow control bodies has a central axis thereof extending generally colinear with the centerline axis of the fluid flow body.

3. The fluid flow enhancing device of claim 1 wherein a width of the perimeter opening of each of the semi-helical flow control bodies is generally the same.

4. The fluid flow enhancing device of claim 1 wherein the perimeter opening of each of the semi-helical flow control bodies is generally aligned with the perimeter opening of each adjacent one of the semi-helical flow control bodies.

5. The fluid flow enhancing device of claim 1 wherein the fluid flow passage extends generally straight between the fluid flow inlet and the fluid flow outlet.

6. The fluid flow enhancing device of claim 1 wherein:
    the fluid flow body is cylindrically-shaped; and
    opposing end portions of the cylindrically-shaped fluid flow body each define a respective one of the fluid flow inlet and the fluid flow outlet.

7. The fluid flow enhancing device of claim 1 wherein the helical length of each of the semi-helical flow control bodies is not greater than about 200 degrees.

8. The fluid flow enhancing device of claim 7 wherein a width of the perimeter opening of each of the semi-helical flow control bodies is generally the same.

9. The fluid flow enhancing device of claim 7 wherein each of the semi-helical flow control bodies is equally spaced along the centerline axis of the fluid flow body from each adjacent one of the semi-helical flow control bodies and has a common pitch with respect to each of the other semi-helical flow control bodies.

10. The fluid flow enhancing device of claim 7 wherein each of the semi-helical flow control bodies has a central axis thereof extending generally colinear with the centerline axis of the fluid flow body.

11. The fluid flow enhancing device of claim 1 wherein the perimeter opening of each of the semi-helical flow control bodies is generally aligned with the perimeter opening of each adjacent one of the semi-helical flow control bodies.

12. The fluid flow enhancing device of claim 1 wherein all of the semi-helical flow control bodies have the same dimensional specifications.

13. The fluid flow enhancing device of claim 1 wherein:
    each of the semi-helical flow control bodies is equally spaced along the centerline axis of the fluid flow body from each adjacent one of the semi-helical flow control bodies and has a common pitch with respect to each of the other semi-helical flow control bodies;
    each of the semi-helical flow control bodies has a central axis thereof extending generally colinear with the centerline axis of the fluid flow body;
    a width of the perimeter opening of each of the semi-helical flow control bodies is generally the same; and
    the perimeter opening of each of the semi-helical flow control bodies is generally aligned with the perimeter opening of each adjacent one of the semi-helical flow control bodies.

14. The fluid flow enhancing device of claim 13 wherein the helical length of each of the semi-helical flow control bodies is not greater than about 200 degrees.

15. A fluid flow enhancing device, comprising:
    a fluid flow body having a fluid flow inlet at a first end portion, a fluid flow outlet at a second end portion and a fluid flow passage extending between and in fluid communication with the fluid flow inlet and the fluid flow outlet, wherein the fluid flow body is cylindrically-shaped and wherein opposing end portions of the cylindrically-shaped fluid flow body each define a respective one of the fluid flow inlet and the fluid flow outlet; and a plurality of flow diverters each attached to an interior surface of the fluid flow body within the fluid flow passage thereof, wherein each of the flow diverters extends partially around a centerline axis of the fluid flow body in a helical manner, wherein each of the flow diverters has a helical length greater than 180 degrees and less than 360 degrees such that opposing end portions of each of the flow diverters are laterally and axially spaced apart relative to the centerline axis of the fluid flow body to define a perimeter opening therebetween, wherein each of the flow diverters is axially spaced apart along the centerline axis of the fluid flow body from each adjacent one of the flow diverters, wherein at least a lower edge portion of each of said opposing end portions is located at a position below a reference axis extending transversely through the centerline axis of the fluid flow body and wherein the perimeter opening of each of the flow diverters is generally aligned with the perimeter opening of each adjacent one of the flow diverters.

16. The fluid flow enhancing device of claim 15 wherein:
each of the flow diverters has a central axis thereof extending generally colinear with the centerline axis of the fluid flow body;
each of the flow diverters has a fluid diverting surface that extends contiguously from a leading edge located a first distance from the fluid flow inlet to a trailing edge located a second distance from the fluid flow inlet;
the second distance is greater than the first distance; and
all of the flow diverters have the same dimensional specifications.

17. The fluid flow enhancing device of claim 15 wherein each of the flow diverters extends partially around the centerline axis of the fluid flow body in an angular amount not greater than about 200 degrees.

18. The fluid flow enhancing device of claim 17 wherein each of the flow diverters is equally spaced along the centerline axis of the fluid flow body from each adjacent one of the flow diverters and has a common pitch with respect to each of the other flow diverters.

19. The fluid flow enhancing device of claim 15 wherein each of the flow diverters is equally spaced along the centerline axis of the fluid flow body from each adjacent one of the flow diverters and has a common pitch with respect to each of the other flow diverters.

20. A method of making a fluid flow enhancing device, comprising the steps of:
providing a fluid flow body having a fluid flow inlet at a first end portion, a fluid flow outlet at a second end portion and a fluid flow passage extending between and in fluid communication with the fluid flow inlet and the fluid flow outlet; and
providing a plurality of semi-helical flow control bodies each having a helical length greater than 180 degrees and less than 360 degrees such that opposing end portions of each of the semi-helical flow control bodies are laterally and axially spaced apart relative to a centerline axis of the fluid flow body to define a perimeter opening therebetween; and
attaching each of the semi-helical flow control bodies to an interior surface of the fluid flow body within the fluid flow passage thereof, wherein attaching each of the semi-helical flow control bodies to the interior surface of the fluid flow body includes rotationally orienting each of the semi-helical flow control bodies for causing the perimeter opening of each of the semi-helical flow control bodies to be at least partially aligned with the perimeter opening of each adjacent one of the semi-helical flow control bodies, for causing each of the semi-helical flow control bodies to be axially spaced apart along the centerline axis of the fluid flow body from each adjacent one of the semi-helical flow control bodies and for causing a lower edge portion of each of said opposing end portions to be located at a position below a reference axis extending transversely through the centerline axis of the fluid flow body.

21. The method of claim 20 wherein attaching each of the semi-helical flow control bodies to the interior surface of the fluid flow body includes positioning each of the semi-helical flow control bodies such that a central axis thereof extends generally colinear with the centerline axis of the fluid flow body.

22. The method of claim 20 wherein attaching each of the semi-helical flow control bodies to the interior surface of the fluid flow body includes positioning each of the semi-helical flow control bodies such that each of the semi-helical flow control bodies is equally spaced along the centerline axis of the fluid flow body from each adjacent one of the flow diverters.

* * * * *